United States Patent
Cole et al.

(10) Patent No.: US 10,510,180 B2
(45) Date of Patent: *Dec. 17, 2019

(54) LEARNING TO RECONSTRUCT 3D SHAPES BY RENDERING MANY 3D VIEWS

(71) Applicant: Google LLC, Mountain View, CA (US)

(72) Inventors: Forrester H. Cole, Cambridge, MA (US); Kyle Genova, Princeton, NJ (US)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/514,618

(22) Filed: Jul. 17, 2019

(65) Prior Publication Data

US 2019/0340808 A1     Nov. 7, 2019

Related U.S. Application Data

(63) Continuation of application No. 15/813,338, filed on Nov. 15, 2017, now Pat. No. 10,403,031.

(51) Int. Cl.
*G06T 15/20* (2011.01)
*G06K 9/00* (2006.01)
(Continued)

(52) U.S. Cl.
CPC ........ *G06T 15/205* (2013.01); *G06K 9/00201* (2013.01); *G06K 9/00214* (2013.01);
(Continued)

(58) Field of Classification Search
USPC ................................ 382/118, 154, 155, 159
See application file for complete search history.

(56) References Cited

U.S. PATENT DOCUMENTS 9,916,685 B1 * 3/2018 Prabhu ..................... G06T 17/10
10,013,801 B2 * 7/2018 Mehr ........................ G06F 17/11
(Continued)

OTHER PUBLICATIONS

Blanz et al. "A Morphable Model for the Synthesis of 3D Faces," Proceedings of the 26th Annual Conference on Computer graphics and interactive techniques. Jul. 1999, 8 pages.
(Continued)

*Primary Examiner* — Ishrat I Sherali
(74) *Attorney, Agent, or Firm* — Fish & Richardson P.C.

(57) ABSTRACT

Methods, systems, and apparatus for obtaining first image features derived from an image of an object, providing the first image features to a three-dimensional estimator neural network, and obtaining, from the three-dimensional estimator neural network, data specifying an estimated three-dimensional shape and texture based on the first image features. The estimated three-dimensional shape and texture are provided to a three-dimensional rendering engine, and a plurality of three-dimensional views of the object are generated by the three-dimensional rendering engine based on the estimated three-dimensional shape and texture. The plurality of three-dimensional views are provided to the object recognition engine, and second image features derived from the plurality of three-dimensional views are obtained from the object recognition engine. A loss is computed based at least on the first and second image features, and the three-dimensional estimator neural network is trained based at least on the computed loss.

16 Claims, 5 Drawing Sheets

(51) Int. Cl.
*G06K 9/62* (2006.01)
*G06K 9/46* (2006.01)
*G06T 17/00* (2006.01)

(52) U.S. Cl.
CPC ..... *G06K 9/00268* (2013.01); *G06K 9/00281* (2013.01); *G06K 9/4628* (2013.01); *G06K 9/6271* (2013.01); *G06T 17/00* (2013.01)

(56) References Cited

U.S. PATENT DOCUMENTS

| | | | | |
|---|---|---|---|---|
| 10,403,031 | B2* | 9/2019 | Cole | G06T 15/205 |
| 2005/0008199 | A1* | 1/2005 | Dong | G06K 9/00288 |
| | | | | 382/115 |
| 2010/0111370 | A1* | 5/2010 | Black | G06K 9/00369 |
| | | | | 382/111 |
| 2011/0075916 | A1* | 3/2011 | Knothe | G06K 9/00201 |
| | | | | 382/154 |
| 2011/0216065 | A1* | 9/2011 | Liu | G06T 11/00 |
| | | | | 345/428 |
| 2017/0032222 | A1* | 2/2017 | Sharma | G06K 9/6256 |
| 2017/0091529 | A1* | 3/2017 | Beeler | G06K 9/00214 |
| 2019/0005313 | A1* | 1/2019 | Vemulapalli | G06K 9/00295 |
| 2019/0035149 | A1* | 1/2019 | Chen | G06T 15/04 |
| 2019/0095698 | A1* | 3/2019 | Cole | G06T 11/60 |
| 2019/0108396 | A1* | 4/2019 | Dal Mutto | G06K 9/00664 |

OTHER PUBLICATIONS

Cole et al. "Synthesizing Normalized Faces from Facial Identity Features," arXiv 1611.07004v2, Oct. 17, 2017, 14 pages.
Genova et al. "Unsupervised Training for 3D Morphable Model Regression," IEEE/CVF Conference on Computer Vision and Patter Recognition, Jun. 15, 2018, 20 pages.
Gu et al. "Geometry Images," ACM Transactions on Graphics, 21(3), Jul. 2002, 7 pages.
Nguyen et al. "Deep Neural Networks are Easily Fooled: High Confidence Prediction for Unrecognizable Images," Proceedings of the 2015 Conference on Computer Vision and Pattern Recognition, 20 pages.
Parkhi et al. "Deep Face Recognition," BMVC, vol. 1(3), Sep. 2015, 12 pages.
PCT International Search Report and Written Opinion issued in International Application No. PCT/US2018/056418, dated Jan. 23, 2019, 16 pages.
Richardson et al. "Learning Detailed Face Reconstruction from a Single Image," arXiv1611.05053v1, Nov. 15, 2016, 10 pages.
Schroff et al. "FaceNet: A Unified Embedding for Face Recognition and Clustering," arXiv 1503.03832v3 Jun. 17, 2015, 10 pages.
Sela et al. "Unrestricted Facial Geometry Reconstruction Using Image-to-Image Translation," arXiv 1703.10131v2 Sep. 15, 2017, 18 pages.
Tewari et al. "MoFA: Model-based Deep Convolutional Face Autoencoder for Unsupervised Monocular Reconstructions," arXiv 1703.10580v1, Mar. 30, 2017, 10 pages.
Tran et al. "Regressing Robust and Discriminative 3D Morphable Models with a very Deep Neural Network," arXiv 1612.04904, Dec. 15, 2016, 10 pages.

* cited by examiner

LEARNING TO RECONSTRUCT 3D SHAPES BY RENDERING MANY 3D VIEWS

CROSS-REFERENCE TO RELATED APPLICATIONS

This application is a continuation application of, and claims priority to, U.S. patent application Ser. No. 15/813,338, titled "LEARNING TO RECONSTRUCT 3D SHAPES BY RENDERING MANY 3D VIEWS," filed on Nov. 15, 2017. The disclosure of the foregoing application is incorporated herein by reference in its entirety for all purposes.

BACKGROUND

Three-dimensional (3D) rendering is a process by which an image having a depth of field, referred to herein as a view, is generated from a data representation of a 3D object. For example, a 3D object may be represented by 3D shape data that describes the form of an outer surface of the 3D object, and texture data that describes characteristics of the outer surface of the 3D object. 3D rendering uses the 3D shape and the texture to generate a view of the 3D object. The view may be representative of a particular viewpoint of the 3D object, such as a plan or isometric view of the 3D object, and a particular lighting of the 3D object, such as a back-lit, side-lit, or ambient-lit view of the 3D object from the particular viewpoint.

3D rendering can be done by a variety of systems. One such system is a neural network. Neural networks are machine learning models that employ one or more layers to create an output, e.g., a classification, for a received input. Some neural networks include one or more hidden layers in addition to an output layer. The output of each hidden layer is provided as an input to a next layer in the neural network, i.e., a next hidden layer or an output layer of the neural network. Each layer of the neural network generates an output from a received input in accordance with current values of a respective set of parameters. Neural networks can undergo training to increase the accuracy of the neural network outputs.

SUMMARY

Innovative aspects of the subject matter described in this specification may be embodied in methods, systems, and computer-readable devices storing instructions configured to perform the actions of obtaining, from an object recognition engine, data specifying first image features derived from an image of an object; providing the first image features to a three-dimensional estimator neural network; obtaining, from the three-dimensional estimator neural network, data specifying (i) an estimated three-dimensional shape and (ii) an estimated texture that are each based on the first image features; providing the data specifying (i) the estimated three-dimensional shape and (ii) the estimated texture to a three-dimensional rendering engine; obtaining, from the three-dimensional rendering engine, data specifying a plurality of three-dimensional views of the object that are each generated based on the data specifying (i) the estimated three-dimensional shape and (ii) the estimated texture; providing the data specifying each of the plurality of three-dimensional views to the object recognition engine; obtaining, from the object recognition engine and for each of the plurality of three-dimensional views specified by the data, data specifying second image features derived from the data specifying the three-dimensional view; computing, based at least on the data specifying the first image features and the data specifying the second image features, a first loss based on a first loss function; and training the three-dimensional estimator neural network based at least on the computed first loss.

These and other embodiments may each optionally include one or more of the following features. In various examples, the object is a face of a person; the image of the face of the person is a synthetic image that is generated based on data specifying (i) a synthetic three-dimensional shape and (ii) a synthetic texture; the features may comprise computing, based at least on (i) the data specifying the synthetic three-dimensional shape and the synthetic texture and (ii) the data specifying the estimated three-dimensional shape and the estimated texture, a second loss based on a second loss function; and training the three-dimensional estimator neural network based at least on the computed first loss and the computed second loss; generating the synthetic image of the face of the person based on the data specifying (i) the synthetic three-dimensional shape and (ii) the synthetic texture comprises generating a rendering that is based on (i) a particular pose and a particular lighting of the synthetic three-dimensional shape and (ii) the synthetic texture; the computed second loss indicates a substantiality of differences between (i) vertices that are determined based on the synthetic three-dimensional shape and synthetic texture and (ii) vertices that are determined based on the estimated three-dimensional shape and the estimated texture.

These and other embodiments may also each optionally include one or more of the following features. In various examples, the computed first loss indicates a substantiality of differences between the first image features and the second image features; the object recognition engine is a facial recognition neural network; the three-dimensional rendering engine is one of a three-dimensional rendering neural network or a three-dimensional rasterization engine; each of the plurality of three-dimensional views is generated based on a respective pose and a respective lighting that is distinct from a pose and a lighting of each of the other three-dimensional views.

This specification relates to training neural networks, and one particular implementation relates to training a neural network that estimates three-dimensional (3D) shapes and textures of objects. More particularly, the specification describes a system that can improve the accuracy of a 3D estimator neural network that is configured to generate a data representation of a 3D object from an image of the 3D object. The 3D estimator neural network receives image features derived from an image and, based on the image features, generates a 3D shape and a texture of a 3D object represented in the image. The 3D shape and the texture can be provided to a 3D renderer to generate views of the 3D object depicted in the image. The views of the 3D object generated by the 3D renderer are computer-generated images that can be representative of a plurality of different viewpoints and a plurality of different lighting angles and intensities.

To improve the accuracy of the views of the 3D object, i.e., so that the views more accurately resemble the object in the original image, training of the 3D estimator neural network is performed. Training the 3D estimator neural network can improve the accuracy of the 3D shape and texture of the 3D object represented in the image that are generated by the 3D estimator neural network, which in turn, can improve the 3D renderings so that they more closely resemble the original 3D object.

However, there are generally two difficulties in training a 3D estimator neural network. First, training pairs, consisting of images of 3D objects and 3D shapes and textures of those 3D objects, are generally limited and difficult to obtain. Second, training a 3D estimator neural network can frequently result in network fooling of the 3D estimator neural network. Network fooling occurs when a 3D estimator neural network is trained to generate a 3D shape and texture for an object such that renderings of the 3D shape and texture, when processed by an object recognition engine, have image features that substantially match the original image features, but visually appear very different from the original image. Thus, network fooling results in a trained network that, for a set of data, outputs an acceptable result that, from a human perspective, is perceived to be an anomalous result.

The system described herein avoids these difficulties while training a 3D estimator neural network to estimate a 3D shape and texture of an object depicted in an image. To do so, the system can utilize an unsupervised training loop that uses a single photograph to train a 3D estimator neural network, rather than a pairing of an image of a 3D object and a known 3D shape and texture of that 3D object. To mitigate network fooling, the unsupervised training loop also uses a 3D renderer configured to generate multiple views of a 3D shape and texture generated by the 3D estimator neural network. Losses between image features of the multiple views of the estimated 3D shape and texture and the image features of the object depicted in the original image can be used to train the 3D estimator neural network in an unsupervised fashion. Using multiple views of an estimated 3D shape and texture mitigates network fooling, because training the 3D estimator neural network based on multiple views of the estimated 3D shape and texture reduces the chances that a poor estimation of a 3D shape and texture can nevertheless result in a view having image features that substantially match image features of an object in an original image.

In addition to the unsupervised training loop, the system can also use a supervised training loop to avoid the above difficulties. One type of supervised training loop can utilize a 3D renderer to generate a synthetic image of an object based on a synthetic 3D shape and texture for the object. Image features of this synthetic image can be processed by the 3D estimator neural network to generate an estimated 3D shape and texture for the object. Losses between the synthetic 3D shape and texture and the estimated 3D shape and texture can be used to train the 3D estimator neural network in a supervised fashion. In another type of supervised training loop, the system can calculate losses between the pixels of a neutral image of an object, e.g., a front-facing image, and pixels of a view of the object that is generated by rendering an estimated 3D shape and texture of the object from the neutral image.

In one example, a 3D estimator neural network may be used to estimate a 3D shape and texture of a face depicted in a photograph. The estimated 3D shape and texture of the face depicted in the photograph can be rendered by a 3D renderer to generate a computer-generated image, referred to as an avatar, that resembles the face depicted in the photograph. To improve the accuracy of the 3D estimator neural network in estimating 3D shapes and textures of faces in photographs, the system can train the 3D estimator neural network using the unsupervised and/or supervised training loops.

The details of one or more embodiments of the subject matter described in this specification are set forth in the accompanying drawings and the description below. Other potential features, aspects, and advantages of the subject matter will become apparent from these description, the drawings, and the claims.

BRIEF DESCRIPTION OF THE DRAWINGS

Like reference symbols in the various drawings indicate like elements.

DETAILED DESCRIPTION

Figure 1:
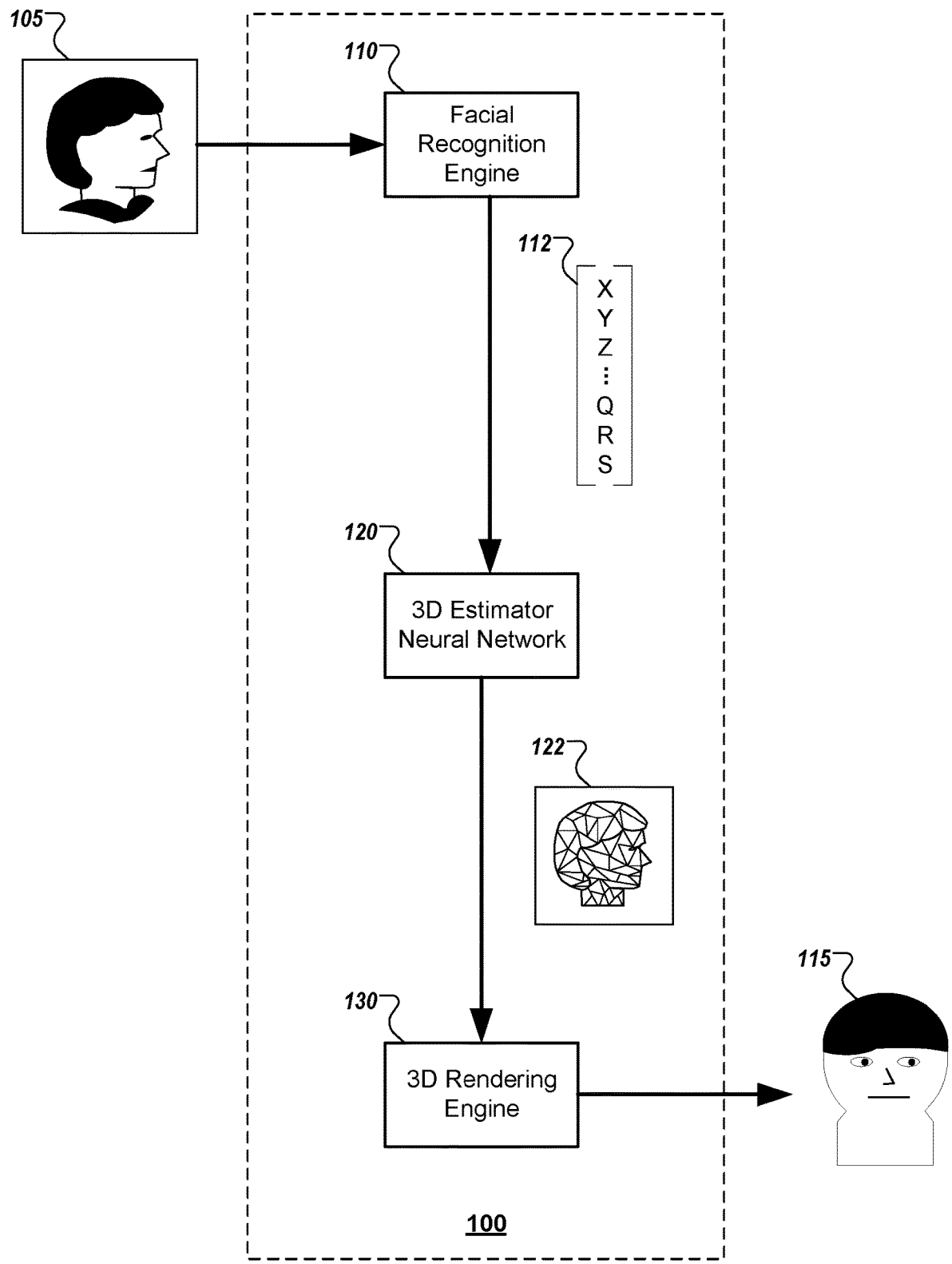
FIG. 1 depicts an example system that uses a 3D estimator neural network to estimate 3D shapes and textures for faces depicted in images and to generate avatars based on the estimated 3D shapes and textures.

FIG. 1 depicts an example system 100 that uses a 3D estimator neural network to estimate 3D shapes and textures for faces depicted in images, and to generate avatars based on the estimated 3D shapes and textures. As shown in FIG. 1, a user may submit a photograph 105 that includes an image of a face to the system 100, and the system 100 may generate an avatar 115 based on processing the photograph 105. The avatar 115 is an estimation of the face in the photograph 105 from a perspective that is different from the perspective in the photograph 105. To generate the avatar 115, the system 100 processes the photograph 105 using a facial recognition engine 110, 3D estimator neural network 120, and 3D rendering engine 130.

Specifically, when the user submits the photograph 105 to the system 100, the photograph 105 is first processed by the facial recognition engine 110. The facial recognition engine 110 is configured to generate image features 112 that correspond to the face of the user depicted in the photograph 105. In some implementations, the facial recognition engine 110 first identifies a portion of the photograph 105 that corresponds to the face of the user. Having identified the portion of the photograph 105 that corresponds to the face of the user, the facial recognition engine 110 can then generate image features that correspond to the face of the user depicted in the photograph 105. In some implementations, as shown in FIG. 1, the image features 112 may be represented as a vector of image features.

After obtaining the image features 112 that correspond to the face of the user depicted in the photograph 105, the system 100 sends the image features 112 to the 3D estimator neural network 120. The 3D estimator neural network 120 is responsible for estimating a 3D shape and a texture of the face of the user depicted in the photograph 105 based on the image features 112. The 3D estimator neural network 112 processes the image features 112 received from the facial recognition engine 110 to generate data 122 that specifies an estimated 3D shape and an estimated texture of the face of the user depicted in the photograph 105.

After obtaining the data 122 specifying the estimated 3D shape and texture of the face of the user depicted in the photograph 105, the system 100 sends the data 122 specifying the estimated 3D shape and texture to the 3D rendering engine 130. The 3D rendering engine 130 is configured to generate the avatar 115 corresponding to the face of the user depicted in the photograph 105 based on the data 122 specifying the estimated 3D shape and texture. The avatar 115 may correspond to a specific view that the 3D rendering engine 130 generates based on the data 122 specifying the estimated 3D shape and texture. The specific view output by the 3D rendering engine 130 may be a rendering of the estimated 3D shape and texture for a given camera angle, lighting, or field of view.

In some implementations, the 3D rendering engine 130 may generate multiple views based on the data 122, such that the system 100 generates multiple versions of the avatar 115. The 3D rendering engine 130 can output one or more of the multiple views as the avatar 115, for example, to provide a number of avatars 115 corresponding to the face of the user depicted in the photograph 105. Multiple avatars 115 corresponding to the single face of the user can be useful in numerous applications, including virtual reality (VR), computer-generated cartoons, and others.

Figure 2A:
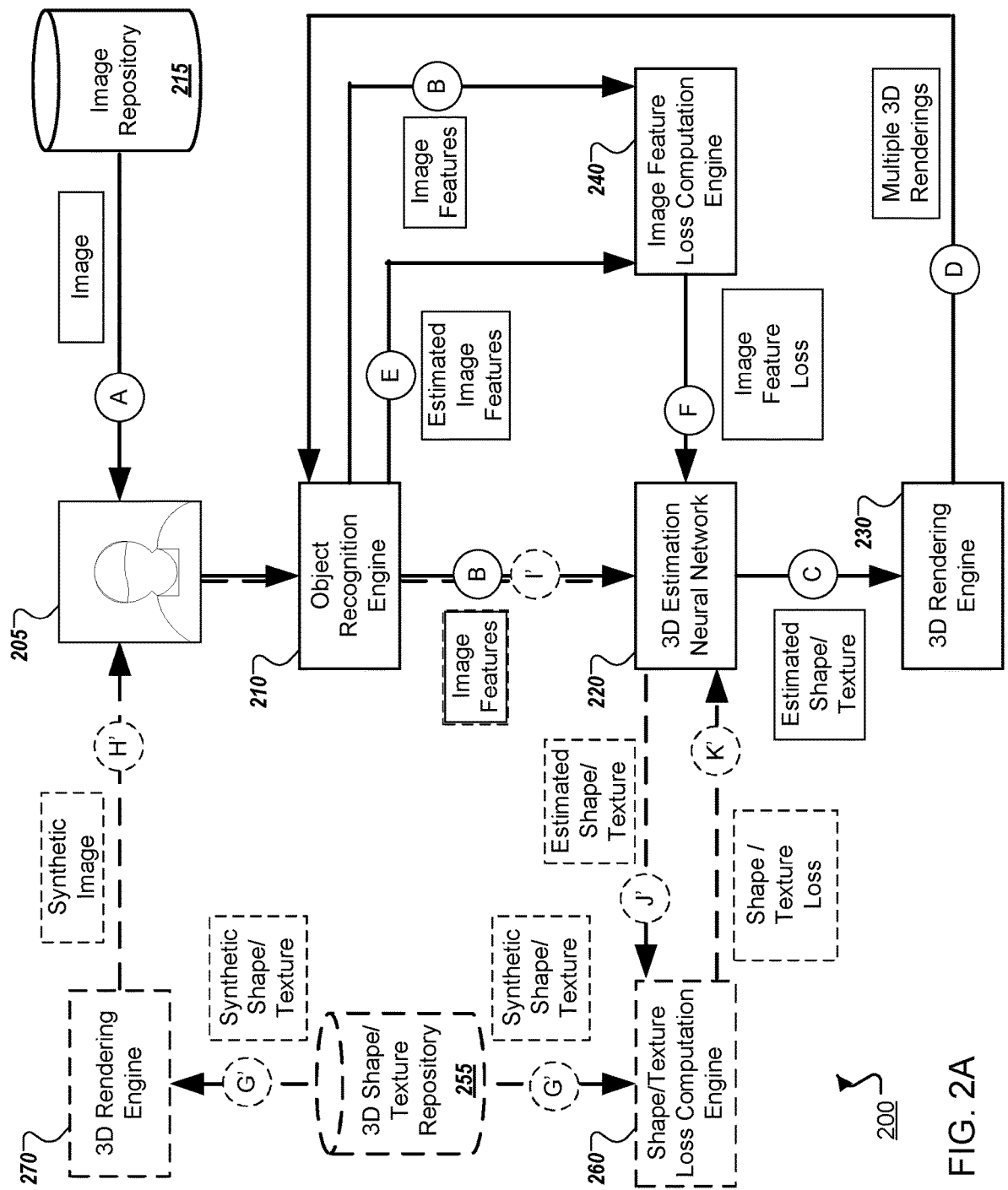
FIGS. 2A and 2B depict example systems for training a 3D estimator neural network to estimate 3D shapes and textures of objects depicts in images.

FIG. 2A depicts an example system 200 for training a 3D estimator neural network 220 (such as the 3D estimator neural network 120 of FIG. 1) to estimate 3D shapes and textures of objects depicted in images with improved accuracy. In some implementations, the example system 200 is configured to perform two types of training loops to train the 3D estimator neural network 220 to estimate objects' 3D shapes and textures: an unsupervised training loop (steps (A) through (F)) and a supervised training loop (steps (G') through (K')). In FIG. 2A, the unsupervised training loop is depicted using solid lines and arrows, while the supervised training loop is depicted using dashed lines and arrows.

In some implementations, training of the 3D estimator neural network 220 follows two general phases, namely a pre-training phase and a full training phase. During the pre-training phase, the supervised training loop is performed in conjunction with the unsupervised training loop. During the full training phase, only the unsupervised training loop is utilized. Use of the supervised training loop during the pre-training phase can bootstrap training of a 3D estimator neural network 220, allowing the outputs of the 3D estimator neural network 220 to converge more quickly, i.e., using fewer iterations of the training loops and a smaller sample size than would be needed if using only the unsupervised loop. After pre-training, the full training can utilize the unsupervised training loop alone for a large number of iterations and a large number of samples to refine the ability of the 3D estimator neural network 220 to estimate a 3D shape and texture of an object in an image.

Because the unsupervised training loop may be used during both the pre-training phase and the full training phase, a discussion of the system 200 of FIG. 2A begins with the unsupervised training loop. Generally, the unsupervised training loop is performed by the object recognition engine 210, 3D estimator neural network 220, 3D rendering engine 230, and image feature loss computation engine 240. The unsupervised training loop performs training using an organic image, i.e., an image that has not been synthetically generated, such as the photograph 105 of the user of FIG. 1.

At step (A) of the unsupervised training loop, the image repository 215 provides an image 205 to the object recognition engine 210 for processing. The image repository 215 may be included in the system 200, e.g., by one or more local wired or wireless connections, or may be remote to the system 200 and in communication with the system 200 over one or more wired or wireless connections, e.g., a local area network (LAN) or wide area network (WAN) connection.

The image repository 215 may be, for example, a database stored locally at the system 200, or a database hosted at a server remote to the system 200.

An image 205 from the image repository 215 used in the unsupervised training loop may be any image in any format and size capable of being processed by the object recognition engine 210. For example, the object recognition engine 210 may be configured to process images that use the JPEG, TIFF, GIF, BMP, or PNG file format standards, or any other raster or vector file format.

The object recognition engine 210 receives the image 205, and processes the image 205 to generate image features. In some implementations, image features generated by the object recognition engine 210 may be represented as feature vectors, i.e., as an n-dimensional vector of numerical features that represent the image. For example, the object recognition engine 210 may detect an object in the image 205, and may generate a feature vector in which the feature values in the vector correspond to the pixels of the object in the image 205. Generating image feature vectors from the image 205 enables the 3D estimator neural network 220 to estimate a 3D shape and texture of an object depicted in the image 205.

In some implementations, the object recognition engine 210 may be a facial recognition neural network, such as FaceNet, produced by Google LLC. Other facial recognition neural networks may also be used. In an example implementation, the object recognition engine 210 is a facial recognition neural network that is configured to receive an image and to produce a 1024-D feature vector containing identity features corresponding to a face detected in an image. In other implementations, the object recognition engine 210 may generate image features using other feature extraction techniques and algorithms that do not rely on neural networks, such as principal component analysis, edge detection, Hough transforms, or other algorithms.

At step (B), the object recognition engine 210 sends the generated image features to both the 3D estimator neural network 220 and the image feature loss computation engine 240. Providing the image features to the image feature loss computation engine 240 enables the image feature loss computation engine 240 to later compute a loss that is used in training the 3D estimator neural network 220, while providing the image features to the 3D estimator neural network 220 enables the 3D estimator neural network 220 to estimate a 3D shape and a texture corresponding to the object detected in the image 205.

The 3D estimator neural network 220 receives the image features corresponding to the object in the image 205 as input to the activation layers of the 3D estimator neural network 220, and generates an estimated 3D shape and an estimated texture corresponding to the image features. The 3D estimator neural network 220 may be any artificial neural network, such as a deep convolutional neural network, that is configured to estimate a 3D shape and a texture based on image features. Other types of artificial neural networks could also be used for the 3D estimator neural network, so long as the neural network is configured to receive as input an image or features derived from an image, and produces an output that is renderable to generate a 3D shape, even if doing so requires transformation after processing by the neural network. For example, a neural network that outputs any of 3D morphable model coordinates, e.g., a 200-D vector of coordinates, voxels, point clouds, deformation operations, or 3D polygonal meshes with fixed or variable topologies could be used as the 3D estimator neural network 220.

For example, the 3D estimator neural network 220 may receive an image feature vector corresponding to the object depicted in the image 205 as input, and may generate an estimated 3D shape and an estimated texture based on the image feature vector. For instances in which the object is a face, the estimated 3D shape may be represented as a 200-D vector for a morphable face. For example, the best-fitting 200 parameters for the face depicted in the image 205 may be identified based on pixel-wise comparisons, such that a 200-D vector estimating the 3D shape of the face and a 200-D vector estimating the texture of the face is generated by the 3D estimator neural network 220. The 3D shape and texture of the face are each generated by separate principal component analysis (PCA) decompositions, such that a 200-D vector representing the 3D shape defines points in a 3D shape space, while a 200-D vector defining vertex colors corresponding to the texture of the face defines points in a shape space. In some examples, the 3D shape and texture of the face may be represented using a 400-D vector that defines both the 3D shape and texture.

In other implementations, a 3D shape and texture of a face depicted in the image 205 may be estimated as a 224×224 pixel geometry image. For example, the image feature vector may be used to generate a parameterization of a 3D shape and texture onto regularly sampled 2-dimensional (2D) grids, i.e., images, known as pixel geometry images. Thus, a first 224×224×3 pixel geometry image may provide shape offsets defining the 3-dimensional (XYZ) coordinate shape of the face, while a second 224×224× pixel geometry image may provide color offsets defining the 3-color (red-green-blue or "RGB") texture of the face. In some examples, both the XYZ coordinate shape of the face and the RGB texture of the face can be represented in a single 224×224×6 pixel geometry image. Other possible representations of a 3D shape and texture may also be output by the 3D estimator neural network 220.

At step (C), the 3D estimator neural network 220 provides the estimated 3D shape and texture of the object depicted in the image 205 to the 3D rendering engine 230. The 3D rendering engine 230 may be a standard or differentiable renderer configured to produce multiple different renderings based on a single 3D shape and texture. Use of a differentiable renderer may provide advantages in some implementations, by generating multiple renderings of a single 3D shape and texture with greater efficiency and simplicity. Each of the multiple renderings corresponds to a specific view of the estimated 3D shape and texture, for example, a distinct camera position, lighting, or camera field of view. In this way, the 3D rendering engine 230 generates multiple different images, each corresponding to a different view of the same estimated 3D shape and texture.

In some implementations, the 3D rendering engine 230 may utilize rasterization to convert the estimated 3D shape and texture into a synthetic 2D image of the object depicted in the image 205. In other implementations, the 3D rendering engine 230 may utilize wireframe rendering, polygon-based rendering, scanline rendering, ray tracing, radiosity, or any other 3D rendering technique. In some implementations, the 3D rendering engine 230 may be a neural network, such that the 3D rendering engine 230 receives the estimated 3D shape and texture from the 3D estimator neural network 220 as input to the neural network, and generates multiple views of the estimated 3D shape and texture by processing this input through the layers of the neural network. Any other technique may be employed at the 3D rendering engine 230, so long as the 3D renderings output by the 3D rendering engine 230 can be back-propagated to the object recognition engine 210 for processing. For example, the 3D renderings may be in the JPEG, TIFF, GIF, BMP, PNG, or other raster or vector file format.

At step (D), the 3D rendering engine 230 sends the multiple 3D renderings to the object recognition engine 210. The use of multiple 3D renderings tends to reduce or eliminate network fooling during training. The object recognition engine 210 receives the multiple 3D renderings, and generates estimated image features that correspond to the multiple 3D renderings. Specifically, the object recognition engine 210 uses the same techniques as used at step (A) to generate image features corresponding to each of the multiple 3D renderings that were generated based on the estimated 3D shape and texture of the object depicted in the image 205. Thus, in some implementations, the object recognition engine 210 may generate an image feature vector corresponding to each of the multiple 3D renderings generated by the 3D rendering engine 230.

While depicted in FIG. 2A as only including a single object recognition engine 210, in some implementations, the system 200 may include multiple object recognition engines 210. In such an implementation, the 3D rendering engine 230 may send the multiple 3D renderings to a different object recognition engine 210 than the object recognition engine 210 that received the image 205 at step (A). In such an implementation, each of the object recognition engines 210 could process images, i.e., the image 205 and the multiple 3D renderings generated by the 3D rendering engine 230, using the same processing method, to allow for proper image feature comparison and loss computation.

At step (E), the object recognition engine sends the estimated image features to the image feature loss computation engine 240. The image feature loss computation engine 240 applies a loss function to the estimated image features and the image features received at step (B) of the unsupervised training loop, to determine a loss caused by the estimation performed by the 3D estimator neural network 220. The loss function determines deviations between the image features generated by the object recognition engine 210 of the object depicted in the image 205 at step (A), and the image features generated by the object recognition engine 210 of the object depicted in each of the multiple 3D renderings. In some implementations, the loss function may represent the deviations as a loss in the accuracy of the image features of the object depicted in the image 205 as a result of the 3D estimator neural network 220 estimating the 3D shape and texture of the object depicted in the image 205.

Having calculated the loss, at step (F), the loss is used to further optimize the 3D estimator neural network 220 to complete the unsupervised training loop. For example, the computed loss may be used to perform parameter optimization for layers of the 3D estimator neural network 220. The unsupervised training loop may be repeated for multiple images from the image repository 215 to iteratively optimize the 3D estimator neural network 220. Parameter optimization enables the 3D estimator neural network 220 to more accurately estimate the 3D shape and the texture of objects depicted in images. Over time and with sufficient training through iterations of the training loop, the 3D estimator neural network 220 may improve such that the image features provided to the image feature loss computation engine 240 by the object recognition engine 210 at step (E) converge to the image features provided to the image feature loss computation engine 240 by the object recognition engine 210 at step (B).

In some implementations, as discussed above, the system 200 may train the 3D estimator neural network 220 using the unsupervised training loop alone after having conducted a pre-training phase that utilizes both a supervised training loop and the unsupervised training loop. During such a pre-training phase, as shown in FIG. 2A, a synthetically generated 3D shape and texture is rendered to generate a synthetic image. The system 200 uses the synthetic image in the unsupervised training loop just as it would use the image 205 from the image repository 215 discussed above. In addition, this synthetic image is used in a supervised training loop to further train the 3D estimator neural network 220. In this way, the pre-training phase effectively allows for optimization of the 3D estimator neural network 220 based on two analyses, namely the unsupervised training loop and the supervised training loop. In contrast, during the full training phase, the system 200 may train the 3D estimator neural network 220 using only the unsupervised training loop.

At step (G') of the supervised training loop, a synthetic 3D shape and texture are provided to a shape and texture loss computation engine 260 and to a 3D rendering engine 270. As described below, the shape and texture loss computation engine 260 utilizes the synthetic 3D shape and texture to compute a second loss, in addition to the loss computed by the image feature loss computation engine 240, that is used to optimize the 3D estimator neural network 220. The synthetic 3D shape and texture are also provided to a 3D rendering engine 270, where the synthetic 3D shape and texture are rendered to generate an image that is used to train the 3D estimator neural network 220.

The synthetic 3D shape and texture are provided to the shape and texture loss computation engine 260 and 3D rendering engine 270 from a 3D shape and texture repository 255. The 3D shape and texture repository 255 stores data corresponding to multiple 3D shape and texture models, each model specifying a 3D shape and texture that describe a particular object. In some examples, the 3D shape and texture repository 255 includes multiple examples for a particular type of object, to allow for training of the 3D estimator neural network 220 on a number of different examples of the same object. For instance, the 3D shape and texture repository 255 may include multiple models, e.g., multiple 200-D vectors, 224×224 pixel geometry images, or other representations, that each represent a face of a person. Training the 3D estimator neural network 220 using multiple faces can improve capabilities of the 3D estimator neural network 220 to estimate the 3D shape and texture of a face depicted in an image.

As with the image repository 215, the 3D shape and texture repository 255 may be included in the system 200, e.g., by one or more local wired or wireless connections, or may be remote to the system 200 and in communication with the system 200 over one or more wired or wireless network connections, e.g., a LAN or WAN connection. The 3D shape and texture repository 255 may be, for example, a database stored locally at the system 200, or a database hosted at a server remote to the system 200.

In some implementations, the 3D shape and texture repository 255 may include an engine configured to randomly generate synthetic 3D shapes or synthetic textures that can be used to generate synthetic images. For example, the 3D shape and texture repository 255 may have a continuous distribution of shapes for an object, e.g., a continuous distribution of parameters of a 3D shape of a human face. To generate the synthetic 3D shape and texture of an object, the 3D shape and texture repository 255 can randomly select from the continuous distribution corresponding to the 3D shape or texture of the object.

The 3D rendering engine 270 receives the synthetic 3D shape and texture, and renders the 3D shape and texture to generate a synthetic image. The synthetic image is a view of the synthetic 3D shape and texture, i.e., a view corresponding to a particular camera position, lighting, and camera field of view.

In some implementations, the system 200 includes only a single 3D rendering engine, such that the 3D rendering engine 230 and 3D rendering engine 270 are the same. In other implementations, as shown in FIG. 2A, the system 200 may include multiple 3D rendering engines. Like the 3D rendering engine 230, the 3D rendering engine 270 may be either a standard or differentiable renderer, especially since only a single synthetic image based on a rendering of the 3D shape and texture is needed in the supervised training loop. However, it may be advantageous for the 3D rendering engine 270 to be a differentiable renderer, as it would enable the system 200 to produce multiple different synthetic images based on a single 3D shape and texture, i.e., multiple images each corresponding to a different camera position, lighting, or camera field of view for the same synthetic 3D shape and texture, more efficiently. Each of the multiple synthetic images of the same 3D shape and texture can be used in an iteration of the supervised training loop to train the 3D estimator neural network 220. Additionally, the use of a differentiable renderer may enable for the computation of losses between the synthetic 3D shape and texture and its rendering that may be used to train a neural network that could be used in the selection of the synthetic 3D shape and texture, i.e., at the 3D shape and texture repository 255.

As with the 3D rendering engine 230, the 3D rendering engine 270 may utilize rasterization, wireframe rendering, polygon-based rendering, scanline rendering, ray tracing, radiosity, or any other 3D rendering technique to generate a synthetic image from the synthetic 3D shape and texture. The synthetic image generated by the 3D rendering engine 270 should, however, be capable of processing by an object recognition engine that is configured to generate image features from the synthetic image, such as the object recognition engine 210. Thus, the rendering of the synthetic 3D shape and texture should have a format that is capable of being processed by the object recognition engine, e.g., a JPEG, TIFF, GIF, BMP, PNG, or other raster or vector file format.

At step (H'), the 3D rendering engine 270 provides the synthetic image to the object recognition engine 210 for processing. The object recognition engine 210 receives the synthetic image, and as with the image 205 in the unsupervised training loop, processes the synthetic image to generate image features. The image feature representation of the synthetic image may be of the same type as is used in the unsupervised training loop, e.g., such that the object recognition engine 210 generates an image feature vector for the synthetic image, to train the 3D estimator neural network 220 to estimate 3D shapes and textures based on a single type of image features, i.e., image feature vectors.

Moreover, the system 200 can perform the unsupervised training loop and supervised training loop simultaneously, such that the unsupervised training loop uses a synthetic image instead of an image from the image repository 215. Therefore, where the system 200 utilizes a single object recognition engine 210 for step (A) of the unsupervised training loop and step (H') of the supervised training loop, the same set of image features for the synthetic image used in the supervised training loop are also used in the unsupervised training loop. In other implementations, however, the unsupervised training loop and the supervised training loop may use distinct object recognition engines 210, e.g., such that during the pre-training phase the system 200 could provide the synthetic image to two distinct object recognition engines 210 that each generate image features corresponding to the synthetic image, or could provide the synthetic image to a first object recognition engine 210 and the image 205 to a second object recognition engine 210.

At step (I'), the object recognition engine 210 sends the generated image features corresponding to the synthetic image to the 3D estimator neural network 220. As at step (B) of the unsupervised training loop, the 3D estimator neural network 220 receives the generated image features and generates an estimated 3D shape and an estimated texture for the object based on the image features. For example, the 3D estimator neural network 220 may receive an image feature vector generated by the object recognition engine 210 that corresponds to the object depicted in the synthetic image. The 3D estimator neural network 220 may use the image feature vector as input and output an estimated 3D shape and texture corresponding to the object depicted in the synthetic image.

At step (J'), the 3D estimator neural network 220 provides the estimated 3D shape and texture corresponding to the object depicted in the synthetic image to the shape and texture loss computation engine 260. The shape and texture loss computation engine 260 applies a loss function to the estimated 3D shape and texture received from the 3D estimator neural network 220 and to the synthetic 3D shape and texture received at step (G') from the 3D shape and texture repository 255. The loss function determines deviations between the synthetic 3D shape and texture and the estimated 3D shape and texture generated by the 3D estimator neural network 220. In some implementations, the loss function may represent the deviations as a loss in accuracy of the 3D shape and texture resulting from the estimation performed by the 3D estimator neural network 220. For example, the shape and texture loss computation engine 260 may apply a loss function that evaluates deviations between the vertices of the synthetic 3D shape and texture and vertices of the estimated 3D shape and texture.

At step (K'), the loss calculated by the shape and texture loss computation engine 260 is used to further optimize the 3D estimator neural network 220, to complete the supervised training loop. For example, the loss computed by the shape and texture loss computation engine 260 may be used to optimize the parameters of the layers of the 3D estimator neural network 220. The system 200 may perform multiple iterations of the supervised training loop to further optimize the 3D estimator neural network 220. Further optimization of the 3D estimator neural network 220 may improve the 3D estimator neural network 220 such that an estimated 3D shape and texture generated by the 3D estimator neural network 220 converges to a corresponding synthetic 3D shape and texture obtained from the 3D shape and texture repository 255.

Figure 2B:
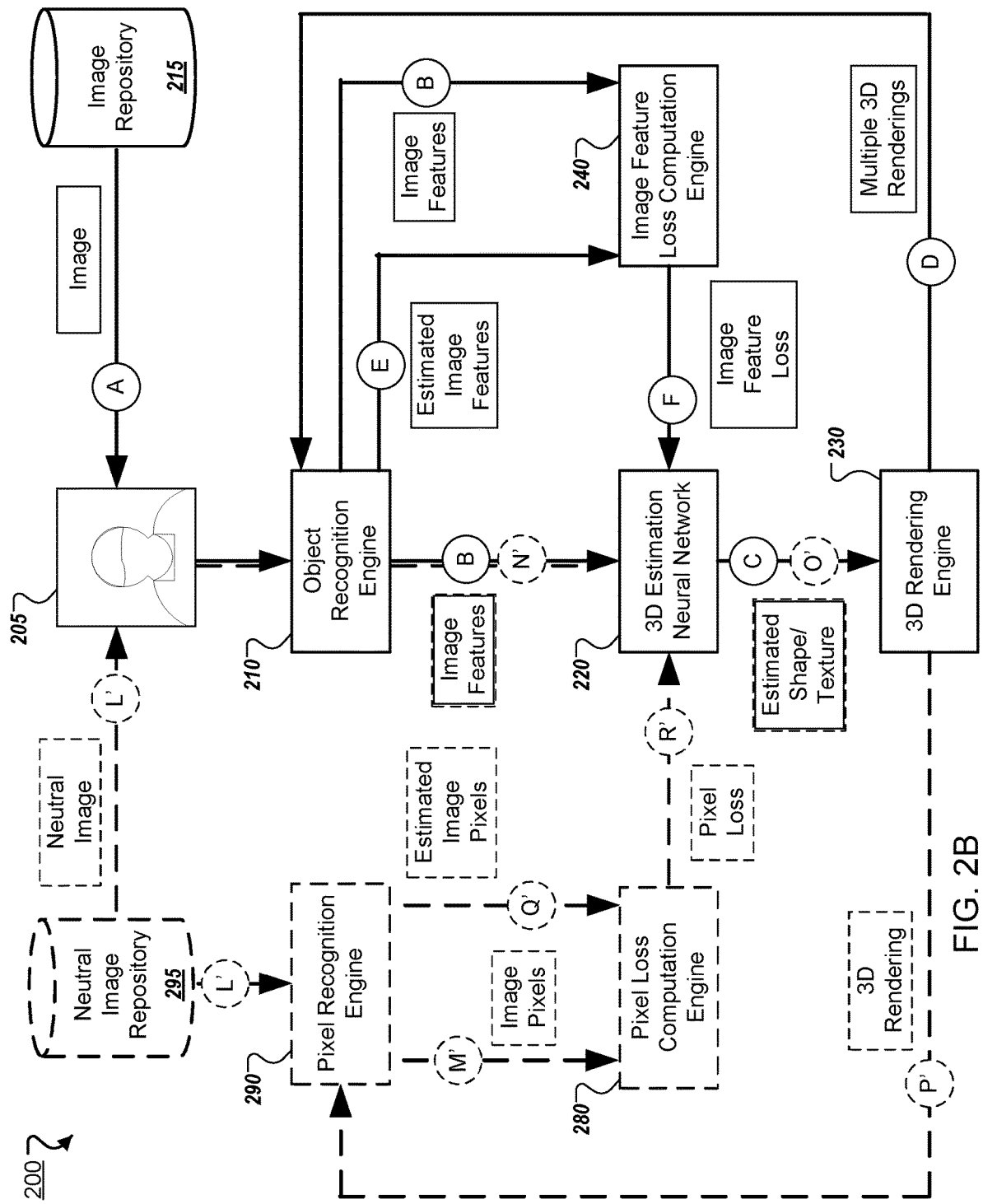

FIG. 2B depicts a second example system 200 for training a 3D estimator neural network to estimate 3D shapes and textures of objects depicts in images. Like FIG. 2A, FIG. 2B also depicts the unsupervised training loop as discussed above (steps (A) through (F)). In addition, FIG. 2B depicts a second supervised training loop (steps (L') through (R')) that may be employed by the system 200 in the training of a 3D estimator neural network. While the supervised training loop of FIG. 2A trained the 3D estimator neural network 220 based on a loss function that analyzes deviations in an estimated 3D shape and texture relative to a synthetic 3D shape and texture, the supervised training loop of FIG. 2B trains the 3D estimator neural network 220 based on a loss function that analyzes deviations in pixels corresponding to a neutral image relative to pixels corresponding to a 3D rendered image that is generated based on a 3D shape and texture estimated by the 3D estimator neural network 220.

In some implementations, the supervised training loop of FIG. 2B may be used in place of, or in combination with, the supervised training loop of FIG. 2A. For example, a pre-training phase may train the 3D estimator neural network 220 based on the unsupervised training loop, the supervised training loop of FIG. 2A, and the supervised training loop of FIG. 2B. In other implementations, the pre-training phase may utilize only the unsupervised training loop and the supervised training loop of FIG. 2B to train the 3D estimator neural network 220.

At step (L') of FIG. 2B, a neutral image is provided to the object recognition engine 210 and to a pixel recognition engine 290. The object recognition engine 210 and pixel recognition engine 290 may receive the neutral image from the neutral image repository 295. The neutral image repository 295 may be included in the system 200, e.g., by one or more local wired or wireless connections, or may be remote to the system 200 and in communication with the system 200 over one or more wired or wireless connections, e.g., a LAN or WAN connection. The neutral image repository 295 may be, for example, a database stored locally at the system 200, or a database hosted at a server remote to the system 200.

As referred to herein, a neutral image is an image having a predetermined camera angle, lighting, or camera field of view of an object. In some examples, a neutral image may also refer to an image depicting an object in a neutral or predetermined position or having a neutral or predetermined expression. For example, the neutral image repository 295 may include multiple images of front-facing, neutral-expression faces. Each of the neutral face images may use a same lighting or camera field of view. While neutral images of different objects may have different common characteristics, in general, the neutral images for a particular object will be images having a same set of characteristics. For example, neutral images of buildings may each be isometric images, i.e., taken from a same particular camera angle, at a same particular lighting and camera field of view, while neutral images of dogs may each show a dog from a profile or side-view in a neutral standing position. The neutral images in the neutral image repository 295 may be in any format or size capable of being processed by the object recognition engine 210 and the pixel recognition engine 290. For example, the neutral images may use the JPEG, TIFF, GIF, BMP, PNG, or any other raster or vector file format.

The object recognition engine 210 receives the neutral image and processes the neutral image in the same way the image 205 is processed by the object recognition engine 210 to generate image features. The image feature representation of the object depicted in the neutral image may be the same as that used in the unsupervised training loop, e.g., an image feature vector.

In some implementations, the system 200 may perform the unsupervised training loop and the supervised training loop of FIG. 2B simultaneously, such that the unsupervised training loop uses a neutral image from the neutral image repository 295 instead of an image from the image repository 215. Therefore, the system 200 may use a single object recognition engine 210 to perform both the unsupervised training loop and the supervised training loop of FIG. 2B, i.e., for step (A) of the unsupervised training loop and for step (H') of the supervised training loop of FIG. 2B. In other implementations, the unsupervised training loop and the supervised training loop of FIG. 2B may use distinct object recognition engines 210, e.g., such that during the pre-training phase the system 200 could provide the neutral image to two distinct object recognition engines 210 that each generate image features corresponding to the neutral image, or could provide the neutral image to a first object recognition engine 210 and the image 205 to a second object recognition engine 210.

The pixel recognition engine 290 also receives the neutral image from the neutral image repository 295, and converts the neutral image to pixels. For example, if the neutral image is in a format that does not utilize a pixel map representation or is of a size or dimension that is not capable of being processed by the pixel loss computation engine 280, the pixel recognition engine 290 may process the neutral image to generate a pixel map or a pixel representation of the neutral image that meets requirements of the pixel loss computation engine 280.

At step (M'), the pixel recognition engine 290 provides the image pixels corresponding to the neutral image to the pixel loss computation engine 280. The pixel loss computation engine 280 can receive the image pixels and can later use the image pixels in computing a loss in pixel accuracy due to 3D shape and texture estimations by the 3D estimator neural network 220, as described below.

At step (N'), the object recognition engine 210 sends the generated image features corresponding to the object depicted in the neutral image to the 3D estimator neural network 220. As at step (B) of the unsupervised training loop, the 3D estimator neural network 220 receives the generated image features corresponding to the object depicted in the neutral image, and estimates a 3D shape and a texture for the object based on the image features. For example, the 3D estimator neural network 220 may receive an image feature vector that corresponds to the object depicted in the neutral image, and using the image feature vector as input, can generate an estimated 3D shape and an estimated texture for the object.

At step (O'), the 3D estimator neural network 220 sends the estimated 3D shape and texture of the object depicted in the neutral image to the 3D rendering engine 230. The 3D rendering engine 230 generates a 3D rendering of the object depicted in the neutral image based on the estimated 3D shape and texture generated by the 3D estimator neural network 220. The 3D rendering engine 230 may generate the 3D rendering of the object depicted in the neutral image using the same techniques as described for step (C) of the unsupervised training loop, for example, by performing rasterization, wireframe rendering, polygon-based rendering, scanline rendering, ray tracing, radiosity, or another 3D rendering technique.

In some implementations, as shown at FIG. 2B, the system 200 includes a single 3D rendering engine 230 that is a differentiable renderer configured to produce multiple different renderings of the estimated 3D shape and texture of the object depicted in the neutral image. In such an implementation, the multiple 3D renderings of the object depicted in the neutral image may be used in the unsupervised training loop to train the 3D estimator neural network 220, as at step (C) of the unsupervised training loop. In other implementations, the system 200 may include multiple 3D rendering engines 230. For example, a first, differentiable 3D rendering engine 230 may be used to generate multiple 3D renderings of the estimated 3D shape and texture of either the object depicted in the neutral image or the object depicted in the image 205 for use in the unsupervised training loop, while a second 3D rendering engine 230 is used to generate a 3D rendering of the estimated 3D shape and texture of the object depicted in the neutral image for use in the supervised training loop of FIG. 2B. In some implementations, the second 3D rendering engine 230 may also be configured to perform differentiable 3D rendering to generate multiple 3D renderings of the object depicted in the neutral image that can be used to train the 3D estimator neural network 220 according to the supervised training loop of FIG. 2B.

At step (P'), the 3D rendering engine 230 sends the 3D rendering generated based on the estimated 3D shape and texture of the object depicted in the neutral image to the pixel recognition engine 290. Similar to step (L') of the supervised training loop of FIG. 2B, the pixel recognition engine 290 can generate a pixel representation of the 3D rendering, or can modify a pixel representation of the 3D rendering to match requirements of the pixel loss computation engine 280. The processing by the pixel recognition engine 290 generates estimated image pixels that correspond to the 3D rendering generated by the 3D rendering engine 230 based on the estimated 3D shape and texture of the object depicted in the neutral image. Where the 3D rendering engine 230 generates multiple 3D renderings of the object based on the estimated 3D shape and texture, the pixel recognition engine 290 may generate multiple sets of pixels each corresponding to one of the 3D renderings.

At Step (Q'), the pixel recognition engine 290 sends the estimated image pixels to the pixel loss computation engine 280. The pixel loss computation engine 280 applies a loss function to the estimated image pixels and to the image pixels received at step (M') of the supervised training loop, corresponding to the neutral image. The pixel loss computation engine 280 applies a loss function to the estimated image pixels and to the image pixels of the neutral image to determine a loss caused by the estimation of the 3D shape and texture by the 3D estimator neural network 220. The loss function determines deviations between the pixels of the neutral image generated by the pixel recognition engine 290 at step (L') and the pixels generated by the pixel recognition engine 290 for the 3D rendering of the estimated 3D shape and texture generated by the 3D estimator neural network 220. In some implementations, the loss function may represent the deviations as a loss in the accuracy of the pixels of the object depicted in the neutral image resulting from the estimation of the 3D shape and texture of the object by the 3D estimator neural network 220.

Having calculated this loss, at step (R') the loss is used to further optimize the 3D estimator neural network 220 to complete the supervised training loop of FIG. 2B. For example, the computed pixel loss may be used to perform parameter optimization for layers of the 3D estimator neural network 220. The supervised training loop may be repeated for multiple neutral images in the neutral image repository 295 to iteratively optimize the 3D estimator neural network 220. As iterations of the supervised training loop of FIG. 2B, optionally in addition to iterations of the unsupervised training loop or the supervised training loop of FIG. 2A, improve the capabilities of the 3D estimator neural network 220 to estimate 3D shape and texture for objects depicted in images, the image pixels and estimated image pixels for a particular object depicted in a particular neutral image will converge, i.e., will demonstrate a decrease in pixel loss.

While discussed generally herein with respect to pre-training and full training phases, other implementations may utilize the unsupervised training loop and supervised training loops of FIGS. 2A and 2B differently. For example, in some implementations, a supervised training loop may be used exclusively, such that the unsupervised training loop is not used to train the 3D estimator neural network 220. In other implementations, the unsupervised training loop may be used exclusively to train the 3D estimator neural network 220, such that the supervised training loops are not used in the training process, i.e., such that only the full training phase is used to train the 3D estimator neural network 220. In still other implementations, training of the 3D estimator neural network 220 may use both the unsupervised and supervised training loops throughout the training process, i.e., such that only the pre-training phase is used to train the 3D estimator neural network 220. In still other implementations, the pre-training and full training phases may be reversed during the training of the 3D estimator neural network 220, such that only the unsupervised training loop is used to initially train the 3D estimator neural network 220, and after a period the unsupervised training loop and one or both of the supervised training loops are used in the training.

Figure 3:
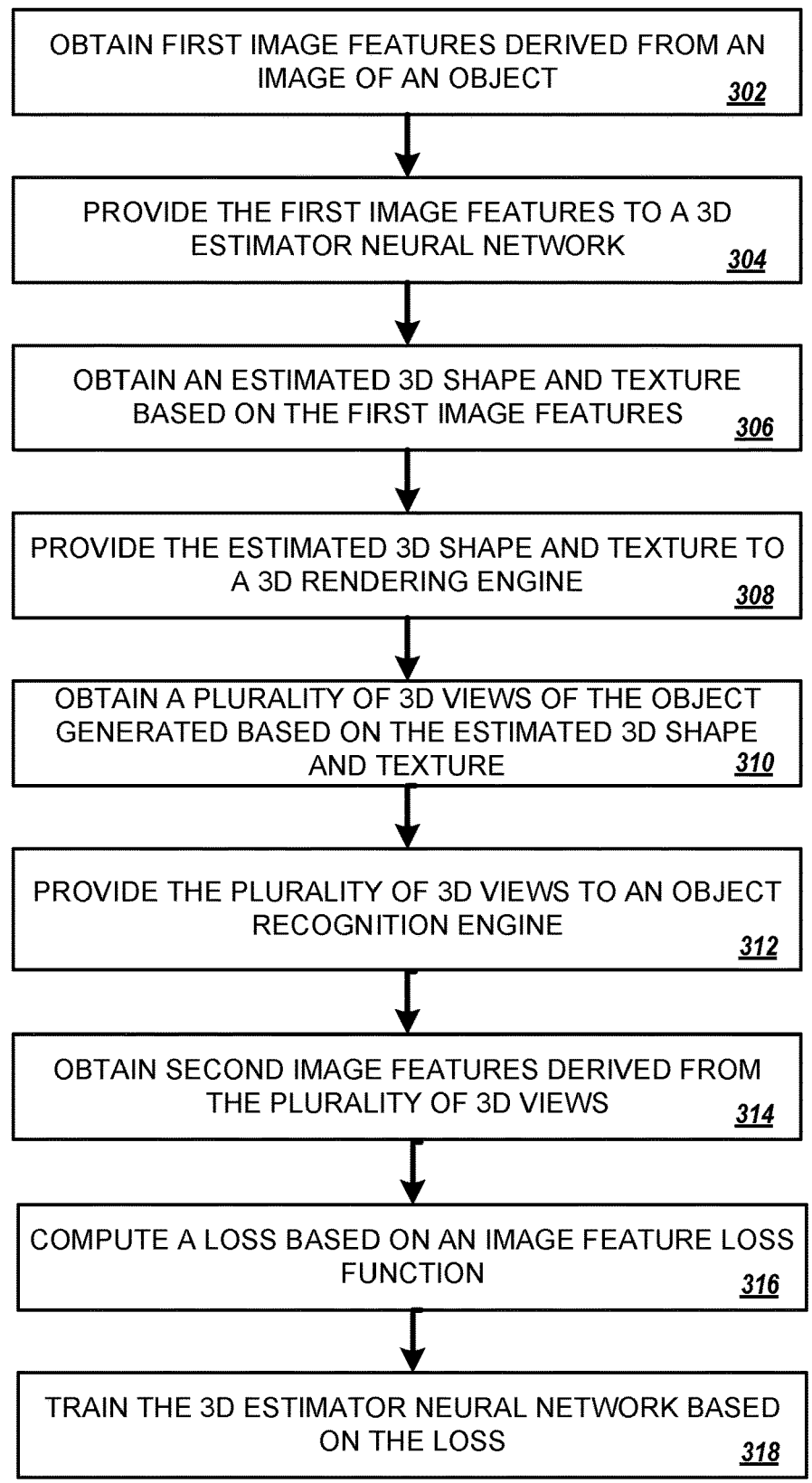
FIG. 3 is a flowchart of an example process for training a 3D estimator neural network using an unsupervised training loop.

FIG. 3 is a flowchart of an example process 300 for training a 3D estimator neural network using an unsupervised training loop. In some implementations, the process 300 may be performed by the system 200 of FIGS. 2A and 2B, or by another system.

The system obtains, from an object recognition engine, data specifying first image features derived from an image of an object (302). For example, the objection recognition engine 210 of FIG. 2A can receive an image of a face from the image repository 215. The object recognition engine 210 can process the image of the face to generate image features corresponding to the face depicted in the image. In some implementations, the image features are represented in an image feature vector that describes the object, e.g., the face, depicted in the image.

The system provides the first image features to a 3D estimator neural network (304). For example, the object recognition engine 210 can provide the image features corresponding to the face depicted in the image to the 3D estimator neural network 220 for processing. The system obtains, from the 3D estimator neural network, data specifying an estimated 3D shape and an estimated texture that are each based on the first image features (306). For example, an image feature vector corresponding to the face depicted in the image can be provided as input to the 3D estimator neural network 220. The 3D estimator neural network 220 can process the image features, e.g., the image feature vector describing the face depicted in the image, to produce an estimated 3D shape and an estimated texture of the face depicted in the image. Data specifying the 3D shape and texture may be, for example, in the form of a 200-D vector or a 224×224 pixel geometry image.

The system provides the data specifying the estimated 3D shape and the estimated texture to a 3D rendering engine (308). For example, the 3D estimator neural network 220 can provide the data specifying a 200-D vector or 224×224 pixel geometry image representing the estimated 3D shape and texture of the face depicted in the image to the 3D rendering engine 230. The system obtains, from the 3D rendering engine, data specifying a plurality of 3D views of the object that are each generated based on the data specifying the estimated 3D shape and the estimated texture (310). For example, the 3D rendering engine 230 can generate multiple images that each have a different view, i.e., a different camera view, lighting, or camera field of view. Each of the images can therefore be a different view of an estimation of the face depicted in the image that are each generated based on the estimated 3D shape and texture.

The system provides the data specifying each of the plurality of 3D views to the object recognition engine (312). For example, the 3D rendering engine 230 can send the generated images that are generated based on the estimated 3D shape and texture of the face depicted in the image to the object recognition engine 210. The system obtains, from the object recognition engine and for each of the plurality of 3D views specified by the data, data specifying second image features derived from the data specifying the 3D view (314). For example, the 3D object recognition engine 210 can process the images generated by the 3D rendering engine 230 to generate image features corresponding to the faces depicted in those images. The object recognition engine 210 may generate, for each view of the face generated by the 3D rendering engine 230, data specifying an image feature vector corresponding to the face.

The system computes, based at least on the data specifying the first image features and the data specifying the second image features, a first loss based on a first loss function (316). For example, the object recognition engine 210 may provide the image feature vectors corresponding to the 3D renderings generated by the 3D rendering engine 230 to the image feature loss computation engine 240. The object recognition engine 210 may also provide to the image feature loss computation engine 240 the image features generated for the original image of the face. The image feature loss computation engine 240 may apply a loss function to the image features to determine deviations between the image features generated for the original image of the face and the image features generated for each of the views of the face that were generated based on the estimated 3D shape and texture. Applying the loss function to the image features may generate a loss that indicates the deviations between the image features for the original image of the face and the image features for the views of the face generated based on the estimated 3D shape and texture.

The system trains the 3D estimator neural network based at least on the computed first loss (320). For example, the system 200 may train the 3D estimator neural network 220 based on the loss generated by the image feature loss computation engine 240, in some implementations by adjusting parameters, such as activation function coefficients, of the layers of the 3D estimator neural network 220. The system 200 may perform multiple iterations of the process 300 to achieve convergence by the 3D estimator neural network 220 on images of faces.

Figure 4:
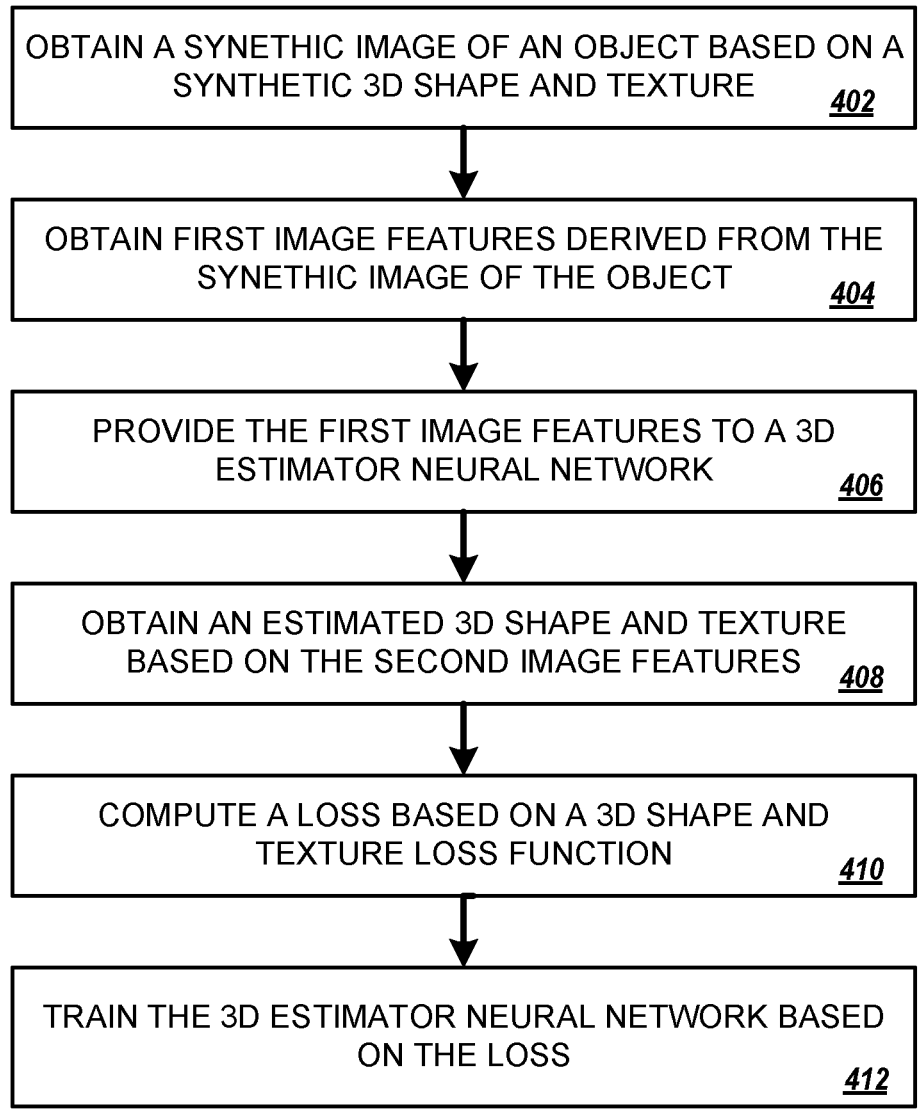
FIG. 4 is a flowchart of an example process for training a 3D estimator neural network using a supervised training loop.

FIG. 4 is a flowchart of an example process 400 for training a 3D estimator neural network using a supervised training loop. In some implementations, the process 400 may be performed by the system 200 of FIG. 2A, or by another system.

The system obtains a synthetic image of an object that is based on a synthetic 3D shape and texture (402). For example, the 3D rendering engine 270 can receive from the 3D shape and texture repository a synthetic 3D shape and texture of a face, i.e., a 3D shape and texture for a face that is created as such rather than being derived from an image of a face. The synthetic 3D shape and texture may be represented, for example, as a 200-D vector or 224×224 pixel geometry image. The 3D rendering engine 270 can render the synthetic 3D shape and texture to generate a synthetic image.

The system obtains first image features that are derived from the synthetic image of the object (404). For example, the 3D rendering engine 270 can provide the synthetic image of the face generated based on the synthetic 3D shape and texture to the object recognition engine 210. The object recognition engine 210 can process the synthetic image to generate image features corresponding to the face depicted in the synthetic image. The image features corresponding to the face depicted in the synthetic image may be represented, for example, in an image feature vector.

The system provides the first image features to a 3D estimator neural network (406). For example, the object recognition engine 210 can provide the image features, e.g., an image feature vector, corresponding to the face depicted in the synthetic image to the 3D estimator neural network 220 for processing. The system obtains, from the 3D estimator neural network, data specifying an estimated 3D shape and an estimated texture that are each based on the first image features (408). For instance, the 3D estimator neural network 220 can use the image feature vector corresponding to the face depicted in the synthetic image as input. Based on this input, the 3D estimator neural network 220 can generate data specifying an estimated 3D shape and an estimated texture of the face depicted in the synthetic image. The data specifying the estimated 3D shape and texture can specify, for example, a 200-D vector, a 224×224 pixel geometry image, or another representation of the estimated 3D shape and texture.

The system computes, based at least on the synthetic 3D shape and texture and the estimated 3D shape and the estimated texture, a first loss based on a first loss function (410). For example, the 3D estimator neural network 220 can provide the estimated 3D shape and the estimated texture corresponding to the face depicted in the synthetic image to the shape and texture loss computation engine 260. The shape and texture loss computation engine 260 may also receive, from the 3D shape and texture repository, the synthetic 3D shape and texture for the face that is rendered to generate the synthetic image. The shape and texture loss computation engine 260 may apply a loss function to the synthetic 3D shape and texture and the estimated 3D shape and texture to determine deviations between the synthetic 3D shape and texture and the estimated 3D shape and texture. Applying the loss function to the 3D shapes and textures may generate a loss that indicates the deviations between the estimated 3D shape and texture for the face and the synthetic 3D shape and texture for the face.

The system trains the 3D estimator neural network based at least on the computed first loss (412). For example, the system 200 may train the 3D estimator neural network 220 based on the loss generated by the shape and texture loss computation engine 260. In some implementations, training the 3D estimator neural network 220 based on the loss may involve adjusting parameters its layers, such as by adjusting coefficients of the layers of the 3D estimator neural network 220. The system 200 may perform multiple iterations of the process 400 to achieve converge by the 3D estimator neural network 220 to estimate 3D shapes and textures of faces.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development or processing of speech inputs for use with applications installed on user devices, the described features may also be used with respect to machines, other devices, robots, or other systems. For example, the described systems and methods may be used to improve user interactions with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
  obtaining, from an object recognition engine, data specifying first image features derived from an image of an object;
  providing the first image features to a three-dimensional estimator neural network;
  obtaining, from the three-dimensional estimator neural network, data specifying (i) an estimated three-dimensional shape based on the first image features;
  providing the data specifying the estimated three-dimensional shape to a three-dimensional rendering engine;
  obtaining, from the three-dimensional rendering engine, data specifying a plurality of three-dimensional views of the object that are each generated based on the data specifying the estimated three-dimensional shape;
  providing the data specifying each of the plurality of three-dimensional views to the object recognition engine;
  obtaining, from the object recognition engine and for each of the plurality of three-dimensional views specified by the data, data specifying second image features derived from the data specifying the three-dimensional view;

computing, based at least on the data specifying the first image features and the data specifying the second image features, a first loss based on a first loss function; and training the three-dimensional estimator neural network based at least on the computed first loss.

2. The computer-implemented method of claim 1, wherein the object is a face of a person.

3. The computer-implemented method of claim 2, wherein the image of the face of the person is a synthetic image that is generated based on data specifying a synthetic three-dimensional shape.

4. The computer-implemented method of claim 3, comprising:

computing, based at least on the data specifying the synthetic three-dimensional shape and the data specifying the estimated three-dimensional shape, a second loss based on a second loss function; and training the three-dimensional estimator neural network based at least on the computed first loss and the computed second loss.

5. The computer-implemented method of claim 3, wherein generating the synthetic image of the face of the person based on the data specifying the synthetic three-dimensional shape comprises:

generating a rendering that is based on a particular pose and a particular lighting of the synthetic three-dimensional shape.

6. The computer-implemented method of claim 3, wherein the computed second loss indicates a substantiality of differences between (i) vertices that are determined based on the synthetic three-dimensional shape and (ii) vertices that are determined based on the estimated three-dimensional shape.

7. The computer-implemented method of claim 1, wherein the computed first loss indicates a substantiality of differences between the first image features and the second image features.

8. The computer-implemented method of claim 1, wherein the object recognition engine is a facial recognition neural network.

9. The computer-implemented method of claim 1, wherein the three-dimensional rendering engine is one of a three-dimensional rendering neural network or a three-dimensional rasterization engine.

10. The computer-implemented method of claim 1, wherein each of the plurality of three-dimensional views is generated based on a respective pose and a respective lighting that is distinct from a pose and a lighting of each of the other three-dimensional views.

11. A system comprising:

a processor configured to execute computer program instructions; and a computer storage medium encoded with computer programs that, when executed by the processor, cause the system to perform operations comprising:

obtaining, from an object recognition engine, data specifying first image features derived from an image of an object;

providing the first image features to a three-dimensional estimator neural network;

obtaining, from the three-dimensional estimator neural network, data specifying (i) an estimated three-dimensional shape based on the first image features;

providing the data specifying the estimated three-dimensional shape to a three-dimensional rendering engine;

obtaining, from the three-dimensional rendering engine, data specifying a plurality of three-dimensional views of the object that are each generated based on the data specifying the estimated three-dimensional shape;

providing the data specifying each of the plurality of three-dimensional views to the object recognition engine;

obtaining, from the object recognition engine and for each of the plurality of three-dimensional views specified by the data, data specifying second image features derived from the data specifying the three-dimensional view;

computing, based at least on the data specifying the first image features and the data specifying the second image features, a first loss based on a first loss function; and training the three-dimensional estimator neural network based at least on the computed first loss.

12. The system of claim 11, wherein the object is a face of a person.

13. The system of claim 12, wherein the image of the face of the person is a synthetic image that is generated based on data specifying a synthetic three-dimensional shape.

14. The system of claim 13, wherein the operations comprise:

computing, based at least on the data specifying the synthetic three-dimensional shape and the data specifying the estimated three-dimensional shape, a second loss based on a second loss function; and training the three-dimensional estimator neural network based at least on the computed first loss and the computed second loss.

15. The system of claim 13, wherein generating the synthetic image of the face of the person based on the data specifying the synthetic three-dimensional shape comprises:

generating a rendering that is based on a particular pose and a particular lighting of the synthetic three-dimensional shape.

16. A computer-readable device storing software comprising instructions executable by one or more computers which, upon such execution, cause the one or more computers to perform operations comprising:

obtaining, from an object recognition engine, data specifying first image features derived from an image of an object;

providing the first image features to a three-dimensional estimator neural network;

obtaining, from the three-dimensional estimator neural network, data specifying (i) an estimated three-dimensional shape based on the first image features;

providing the data specifying the estimated three-dimensional shape to a three-dimensional rendering engine;

obtaining, from the three-dimensional rendering engine, data specifying a plurality of three-dimensional views of the object that are each generated based on the data specifying the estimated three-dimensional shape;

providing the data specifying each of the plurality of three-dimensional views to the object recognition engine;

obtaining, from the object recognition engine and for each of the plurality of three-dimensional views specified by the data, data specifying second image features derived from the data specifying the three-dimensional view;

computing, based at least on the data specifying the first image features and the data specifying the second image features, a first loss based on a first loss function; and training the three-dimensional estimator neural network based at least on the computed first loss.

* * * * *